Dec. 26, 1939.    J. LÉVAI    2,184,747
FLEXIBLE LINK BAR
Filed Nov. 5, 1938    2 Sheets-Sheet 1
Fig. 1
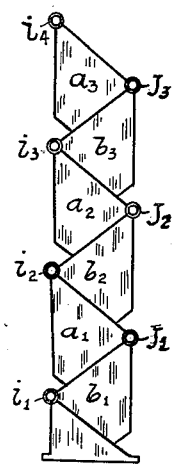
Fig. 2
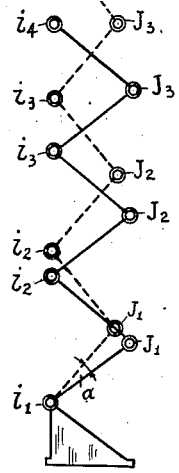
Fig. 3
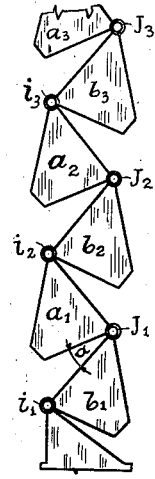
Fig. 4
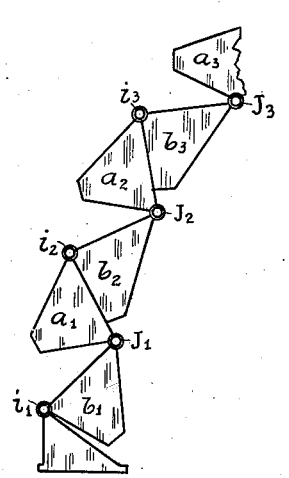
Fig. 5
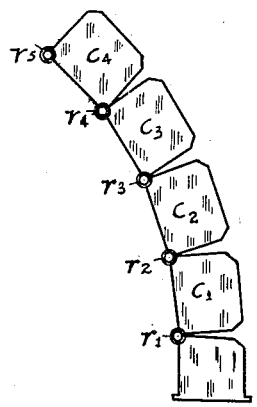
Fig. 6
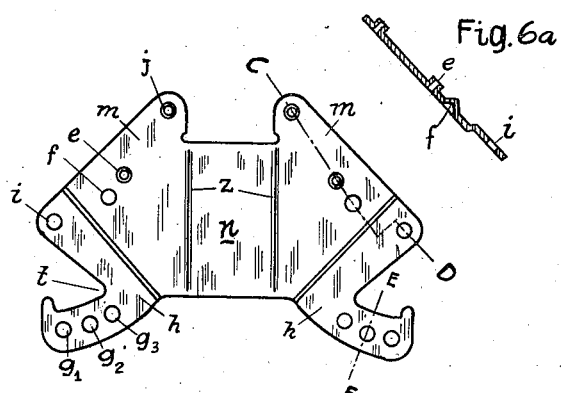
Fig. 6a
Fig. 6b.
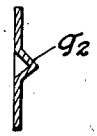
Fig. 7a
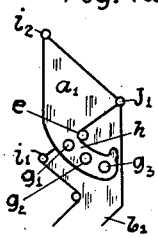
Fig. 7b
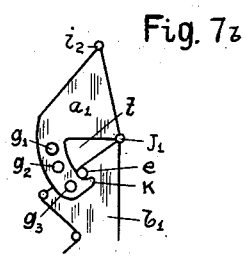
INVENTOR.
Julius Lévai
BY George Benjamin
ATTORNEY.

Dec. 26, 1939.    J. LÉVAI    2,184,747
FLEXIBLE LINK BAR
Filed Nov. 5, 1938    2 Sheets-Sheet 2
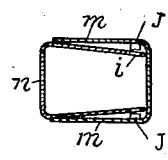
Fig.8
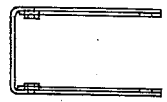
Fig.10
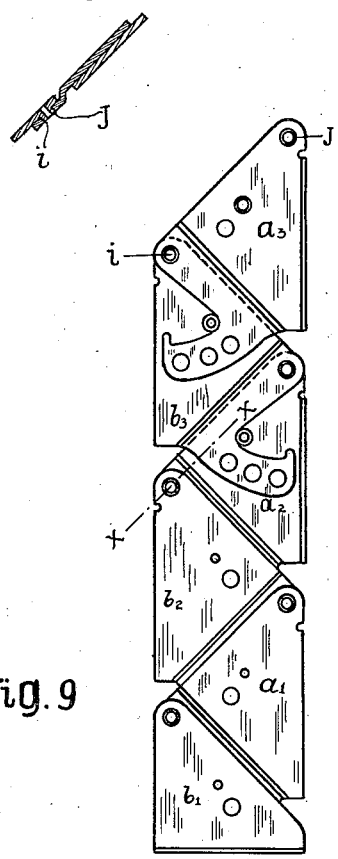
Fig.11
Fig.9
INVENTOR.
Julius Lévai
BY  George Benjamin
ATTORNEY.

Patented Dec. 26, 1939

2,184,747

UNITED STATES PATENT OFFICE 2,184,747

FLEXIBLE LINK BAR

Julius Lévai, Budapest, Hungary

Application November 5, 1938, Serial No. 239,190
In Hungary September 3, 1937

5 Claims. (Cl. 59—78)

The object of the invention is a chain link bar adapted for adjustment into a variety of different shapes to be fixed by interengagement means.

The new bar is distinguished by an extremely simple and rugged construction.

One important feature of the invention is the U-shaped cross-section of the links. This makes it possible to have the links pressed against each other frictionally by their own spring action without any additional spring means, to make use of said spring action in assembling the links to form the bar, to prevent accidental separation of the links from each other, and to snap into engagement interlocking means for securing the links in predetermined positions.

Further features and advantages will appear from the description that follows:

The drawings illustrate two different main modifications of the object of the invention.

Fig. 1 is a diagrammatic side view of a link bar composed of links of triangular shape, connected by hinges or pivots situated alternately at opposite sides of the center line of the bar;

Fig. 2 is a linear diagram of the bar, of straight center line, in extended i. e. drawn out condition;

Fig. 3 shows the bar in its extended position;

Fig. 4 shows the bar according to Fig. 1 in a position bent towards the right-hand side;

Fig. 5 represents a bar composed of quadrangular links, bent towards the left-hand side;

Fig. 6 represents a stamped blank suitable for forming from it a link as shown in Fig. 1;

Fig. 6a is a section along the line C—D of Fig. 6;

Fig 6b is a section on the line E—F of Fig. 6;

Figs. 7a and 7b show two adjacent links in the two end positions respectively;

Fig. 8 shows two links in cross-section during the act of assembling;

Fig. 9 is a side view of a link bar composed of the links according to Fig. 6;

Fig. 10 is a plan view of the same;

Fig. 11 is a section along the line X—X of Fig. 9.

According to Fig. 1 the links are all triangular and of identical shape. The links of the first series are marked $a_1$, $a_2$, $a_3$, and those of the second series $b_1$, $b_2$, $b_3$. The pivots or hinges $i_1$, $i_2$, $i_3$, arranged to the left of the center line of the bar alternate with the pivots or hinges $j_1$, $j_2$, $j_3$, arranged to the right of the said center line.

The links which, according to Fig. 1, are in mutual contact with each other by means of their adjacent oblique sides can be pulled apart, in which case the zig-zag-shaped connection line of the pivots changes from the position shown in full lines in Fig. 2 to the position shown in dotted lines. If all links are deflected relatively to each other by the angle $\alpha$, the length of the bar will become extended in an extent corresponding to such angle, but the bar will retain its straight-line axis (Fig. 3).

If only the links $a_1$, $a_2$, $a_3$ ... are deflected around their pivots $j_1$, $j_2$, $j_3$ ... to the extent of the angle $\alpha$ the center line of the bar will assume the shape of a circular arc bent towards the right (Fig. 4). Deflection of only the links $b_1$, $b_2$, $b_3$ would result in an arc towards the left.

As shown by Fig. 5 the links $c_1$, $c_2$, $c_3$, $c_4$ are of quadrangular shape, and the pivots $r_1$, $r_2$, $r_3$ ... are situated all on one side, e. g., on the left hand side, of the bar, the links being, in this arrangement, capable of deflection towards one side only, and the center line of the bar assuming the shape of a circular arc bent towards the left hand side. If some of the links of Figs. 1 to 4 are deflected around the pivots on the left hand side, and others around the pivots on the right hand side, the center line of the bar may assume any desired curved or broken shape.

The means for fixing the links in various positions will be described in connection with the embodiment to be described now.

In the embodiment according to Figs. 6 to 11, the bar is composed of nested links, for the assembly of which no additional means of connection whatever, such as bolts, rivets, pins, etc., are required. The links $a_1$, $a_2$, $a_3$, $b_1$, $b_2$, $b_3$ of Figs. 1 to 4 are completely identical in shape, and are, when assembling the bar, nested into each other alternately in succession from the right hand and from the left hand side respectively (Fig. 8). The links are made of elastic sheet iron or the like. The blank according to Fig. 6, comprising a central part $n$, two lateral wings $m$, and two extensions $h$, is produced by stamping. The extensions $h$ are slightly offset from the plane of the wings (Fig. 6a). By stamping or pressing are produced simultaneously cylindrical hollow pivots $j$, abutment bosses $e$, conical socket projections $f$ in the wings $m$, and holes $i$, as well as a few, e. g., three, conical nipples $g_1$, $g_2$, $g_3$ in the extensions $h$. The blanks are then bent into U-shape along the lines $z$ (Fig. 6), and are then nested alternately (Fig. 8). The pivots $j$ of each link, as soon as it is released in assembling, will catch into the holes $i$ of the adjacent link (Fig. 11), and one of the nipples $g_1$, $g_2$, $g_3$ will catch into the socket cavity of the projection $f$ of said adjacent link, notably into $g_1$ and $g_3$ in the end positions and into $g_2$ in the central position of the link, so determining the angle of deflection $\alpha$, and the positions of the links. The projections $f$ lie snugly with spring pressure as brake shoes against the opposite surfaces of the wings $m$ of the preceding link. If a certain amount of force is exerted across the longitudinal direction of the bar and of the pivots the nipples $g_1$, $g_2$ or $g_3$ jump out from the sockets.

The abutment boss $e$ of each link lies snugly against the inner arcuate line of the extension $h$, thus acting as a guide and brake. The extension $h$, at its root, has a recess $t$, and, at its free end, a nose $k$. The end wall of the recess or the nose respectively, in the two end positions (Figs. 7a—7b) of the link $a_1$, abut against the boss $e$ and thus secure the bar positively against disruption by excessive forces.

Notwithstanding their resiliency, the wings $h$ cannot be forced out from the assembled bar, even by pressure exerted transversely to the plane of deflection of the links, because the wings $h$ of the links, at the place where the hole $i$ is situated, lie between the wings $h$ of the adjacent links, and are accordingly held fast reliably from both sides.

An advantage of the link bar described consists in the fact that the center line of the bar, even in case of any possible minor inaccuracies or obliqueness of the links, always remains straight, as the alternate "mirror-picture" arrangement of the links, facing alternately to opposite sides, will eliminate such defects.

If any link is moved to the limit of its movement it will carry along the next link by means of the nose $k$ and the abutment $e$.

I claim:

1. A chain link bar of adjustable form, relatively stiff in each adjusted form, comprising in combination at least three links in series arrangement, and hinges connecting said links, said links being of U-shaped cross-section, said hinges being integral with said links, said links consisting of resilient material of an elasticty sufficent to snap said hinges into assembled position, said links overlapping each other so considerably that substantial friction and corresponding stiffness of the bar is produced by such elasticity.

2. A chain link bar of adjustable form, relatively stiff in each adjusted form, comprising in combination at least three links in series arrangement, and hinges connecting said links, said links being of U-shaped cross-section and being adapted to be secured by locking means in predetermined angular positions relative to each other, said locking means being integral with said links, and said links being of sufficient elasticity to snap said locking means into engaged position.

3. A bar as claimed in claim 2, said locking means being of the type releasable by force acting at right angles to the direction of engagement of said locking means.

4. A bar as claimed in claim 2, integral extensions of said links, guiding them on adjacent links, extending close to the hinges of said adjacent links, one half of each of said locking means being integral with said extensions.

5. A chain link bar of adjustable form, relatively stiff in each adjusted form, comprising in combination at least three links in series arrangement, and hinges connecting said links, said links being of U-shaped cross-section, the open ends of the U-shaped cross-sections of adjacent links facing in opposite directions, and said hinges being arranged alternatively on opposite sides of the center line of the bar.

JULIUS LÉVAI.